United States Patent [19]

Hui et al.

[11] Patent Number: 5,030,678
[45] Date of Patent: Jul. 9, 1991

[54] CATIONIC SURFACE SIZING EMULSION

[75] Inventors: Sai H. Hui, Hudson; Mean-Jeng Hou, Copley, both of Ohio

[73] Assignee: PPG Industries, Inc., Pittsburgh, Pa.

[21] Appl. No.: 547,413

[22] Filed: Jul. 2, 1990

Related U.S. Application Data

[63] Continuation of Ser. No. 391,209, Aug. 8, 1989, abandoned.

[51] Int. Cl.$^5$ ................................................ C08K 5/29
[52] U.S. Cl. ...................................... 524/243; 524/244; 524/313; 524/593; 524/598; 524/801; 524/818; 524/877; 525/472; 528/232; 528/423; 427/207.1; 428/530
[58] Field of Search ............... 524/593, 598, 243, 244, 524/313, 801, 818, 877; 525/472; 528/423, 232; 427/207.1; 428/530

[56] References Cited

U.S. PATENT DOCUMENTS

| | | | |
|---|---|---|---|
| 2,509,174 | 5/1950 | Scott et al. | 427/394 |
| 4,013,627 | 3/1977 | Temple | 526/245 |
| 4,044,178 | 8/1977 | Abel et al. | 427/373 |
| 4,452,934 | 6/1984 | Swafford | 524/243 |
| 4,497,934 | 2/1985 | Streetman | 525/58 |

FOREIGN PATENT DOCUMENTS 61-203159 9/1986 Japan .

*Primary Examiner*—John Kight, III
*Assistant Examiner*—S. A. Acquah
*Attorney, Agent, or Firm*—Edward J. Whitfield; George D. Morris

[57] ABSTRACT

Disclosed are cationic aqueous emulsions containing (a) sizing composition comprising the reaction product of melamine formaldehyde compound, long chain saturated alcohol and long chain saturated or unsaturated polyethoxylated alcohol; and (b) cationic surfactant. The emulsions when used to surface size paper impart improved oil, water and polar solvent resistance thereto. The emulsions may be used alone or as substantial replacements for anionic or non-ionic fluorocarbon based emulsions that are typically used to impart oil resistance to paper.

14 Claims, No Drawings

CATIONIC SURFACE SIZING EMULSION

This application is a continuation of application Ser. No. 07/391,209, filed Aug. 8, 1989 now abandoned.

FIELD OF THE INVENTION

This invention relates to cationic aqueous emulsions containing (a) surface sizing composition which is a reaction product of melamine formaldehyde compound with long chain saturated or unsaturated alcohol and polyethoxylated alcohol; and (b) cationic surfactant. The sizing emulsions of the invention impart improved oil, water and polar solvent resistant properties to paper, paperboard and other nonwoven substrates.

BACKGROUND OF THE INVENTION

A variety of chemical surface treatments are used in the paper making industry to impart various properties to the finished paper. Resistance to oil penetration is a particularly desirable property for paper products intended for use as packaging for fatty or greasy materials, for example, fatty or greasy food products. Typically, fluorocarbon compounds are employed as surface sizes or coatings to impart oil penetration resistance. A comprehensive discussion of the use of fluorocarbon compounds, both as internal as well as surface sizes, to impart oil resistance to paper is found in TAPPI Monograph No. 33 by Rengel and Young, pp. 170–188 (1971).

Fluorocarbon surface sizes, though effective, are quite expensive and available from only a few manufacturers, e.g., the proprietary fluorocarbon sizes sold by 3M Company under the "Scotchban" trademark.

Copending, commonly owned U.S. application Ser. No. 07/270,553, filed Nov. 14, 1988 discloses that certain melamine based compositions when applied to paper as surface coatings in the form of nonionic aqueous emulsions, impart, inter alia, oil penetration resistance to the paper. These melamine based compositions can be used alone or can be used to replace a substantial portion of the considerably more expensive fluorocarbon sizes, while still maintaining the high level of oil resistance obtained from the fluorocarbon sizes alone.

It has now been found that when the surface sizing compositions of U.S. application Ser. No. 07/270,553 are applied in the form of cationic aqueous emulsions, as opposed to nonionic or anionic emulsions, that improved oil penetration resistance is imparted to the sized or coated paper.

THE INVENTION

This invention provides aqueous emulsions containing paper surface sizing composition comprising (a) the reaction product of melamine formaldehyde compound, long chain alcohols and long chain polyethoxylated alcohols; and (b) cationic surfactant. When coated on nonwoven substrate, e.g. paper, the emulsions of the invention impart improved oil, polar solvent and water penetration resistance to the substrate. The emulsions of the invention are particularly effective when used in combination with fluorocarbon based surface sizes, enabling use of a substantially less amount of fluorocarbon size while obtaining at least equivalent oil penetration resistance than would obtain if more fluorocarbon size were used alone. For example, contact angle measurements of corn oil and oil/water emulsion droplets on paper surface sized with mixtures of commercially used non-ionic or anionic fluorocarbon sizes and emulsions of the invention show that the invention emulsion can replace up to 60 percent of the expensive fluorocarbon size typically used to surface size paper and still retain excellent oil penetration resistance and in addition, impart excellent water and polar solvent penetration resistance; which water and solvent penetration resistance do not obtain from the use of fluorocarbon size alone.

More particularly, the aqueous emulsions of the invention contain (a) surface sizing composition comprising the reaction product of from about 10 to about 30 weight percent of melamine formaldehyde compound having from 3 to 6 methoxymethyl groups, from about 20 to about 75 weight percent of at least one $C_{12}$ to $C_{30}$ alcohol and from about 5 to about 35 weight percent of at least one $C_{30}$ to $C_{120}$ polyethoxylated alcohol containing from 5 to 50 ethylene oxide groups; and (b) cationic surfactant.

The aqueous emulsions of the invention may contain from about 20 to about 60 weight percent, preferably from about 30 to about 40 weight percent, based on weight of emulsion of sizing composition, from about 1 to about 6 weight percent, preferably from about 2 to about 4 weight percent based on weight of sizing composition of cationic surfactant and the balance, water. The aqueous emulsions of the invention have a pH of from about 3.0 to about 4.0, a specific gravity of from about 0.90 to about 1.0, a viscosity of from about 10 to about 50 cps at 23.8° C. and a boiling point of from about 95° to about 105° C.

Treatment level, of course, depends on the application procedure used and the surface properties required. For example, resistance to oil and low surface tension liquids typically requires a higher treatment level than resistance to water and polar solvents. Optimal treatment level can readily be determined, however, it is believed that from about 0.2 to about 6.0 pounds of sizing composition per ton of dry fiber undergoing surface treatment, would typically be used.

The sizing composition is readily dispersible in water and forms very shear stable aqueous emulsions. Moreover, the sizing composition has excellent compatibility with other typically used sizing additives, e.g., starch, polyvinyl alcohol, cellulose, latexes and the like.

The melamine formaldehyde compound, long chain alcohols and long chain polyethoxylated alcohols used to prepare the sizing composition are known compounds and are commercially available. A preferred melamine formaldehyde compound is hexamethoxymethyl melamine supplied by American Cyanamid Company under the trademark, "Cymel 303". Preferred alcohols are, for example, stearyl alcohol supplied by Sherex Chemical Company under the trademark, "Aldol 20NF" and a mixture of $C_{20}$ to $C_{24}$ alcohols supplied by Vista Chemical Company under the trademark, "Alfol 20+". Exemplary of preferred polyethoxylated alcohols are polyethoxylated lauryl ether and polyethoxylated oleyl ether supplied by the Mazer Chemical business unit of PPG Industries, Inc. under the trademarks, "Macol LA-23" and "Macol OA-20", respectively.

A preferred sizing composition for use in the invention comprises the reaction product of from about 30 to about 50 weight percent stearyl alcohol, from 0 to about 50 weight percent $C_{20}$ to $C_{24}$ alcohols, from about 5 to about 10 weight percent polyethoxylated lauryl ether or polyethoxylated oleyl ether and from about 15 to about 40 weight percent of hexamethoxymethyl melamine.

A particularly preferred sizing composition for use in the invention comprises the reaction product of about 37 to 38 weight percent stearyl alcohol, about 37 to 38 weight percent $C_{20}$ to $C_{24}$ alcohols, from 7 to 8 weight percent polyethoxylated oleyl alcohol and 17.5 to 18.5 weight percent hexamethoxymethyl melamine.

The sizing compositions for use in the invention are readily prepared by melting the normally solid alcohols and polyethoxylated alcohols and mixing the alcohol melt with the liquid hexamethoxymethyl melamine. The reaction mixture is heated to a moderate temperature, i.e. about 65° C.–75° C. and mineral acid, preferably concentrated hydrochloric acid, is added to initiate the reaction. The amount of hydrochloric acid used typically does not exceed about 0.1 weight percent basis total weight of reaction mixture. (To prevent crosslinking care must be taken that the acid does not directly contact the pure hexamethoxymethyl melamine.) After acid addition the temperature is raised to about 130° C.–150° C. and maintained thereat for about 1 to 2 hours, methanol and water being removed by vacuum distillation.

Cationic surfactants suitable for use in the invention are presented by the formula:

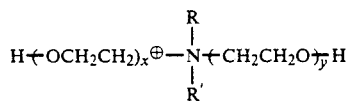

wherein R is $C_1$ to $C_{10}$, preferably $C_1$ to $C_3$ alkyl; R' is $C_{10}$ to $C_{30}$, preferably $C_{12}$ to $C_{20}$ alkyl; and x and y are the same or different and represent an integer of from 1 to 25, preferably from 2 to 10.

Cationic surfactants of the type suitable for use in the invention are commercially available. A preferred cationic surfactant is methyl bis(2-hydroxyethyl) octadecyl ammonium chloride sold, e.g., by Akzo Chemicals, Inc. under the trademark "Ethoquad 18/12".

The invention is further illustrated but is not intended to be limited by the following examples.

EXAMPLE I

Preparation of Sizing Compositions

To a 5-liter capacity 3-necked flask provided with a thermometer, a mechanical stirrer and a condenser was charged 1234.4 grams of stearyl alcohol (Aldol 20NF stearyl alcohol obtained from Sherex Chemical Company). The stearyl alcohol was melted by gradually raising the temperature of the flask by means of a heating mantle provided with a thermowatch. To the molten stearyl alcohol were charged, with stirring, 1232.7 grams of a molten mixture of $C_{20}$–$C_{24}$ saturated alcohols (Alfol 20+ saturated alcohols obtained from Vista Chemical Company), 246.8 grams of polyethoxylated oleyl ether (Macol OA-20 polyethoxylated oleyl ether obtained from Mazer Chemical Company) and 576.3 grams of hexamethoxymethyl melamine (Cymel 303 hexamethoxymethyl melamine obtained from American Cyanamid Company). The reaction mixture was heated to about 70° C., a 200 millimeter Hg vacuum was applied for about 1 minute and 3.3 grams of concentrated hydrochloric acid was added to initiate reaction. The reaction mixture was then gradually heated to a temperature of about 142° C. over an about 2-hour period. An about 100 millimeter Hg vacuum was then applied for about 30 minutes to draw off volatiles. After cooling, 3122.7 grams of desired product were obtained. Gel permeation chromatography of a composition prepared in a manner analagous to the foregoing indicated 6.8 area percent molecular weight below 500 and 4.1 percent between 500 and 1000. The number average molecular weight was about 1200.

EXAMPLE II

Preparation of Aqueous Emulsions

A. 20.017 grams of the composition prepared as described in Example I was charged to a first 100 millimeter beaker which was placed in a water bath maintained at about 70° to 80° C. To a second 100 millimeter beaker were charged 0.593 grams of polyethoxylated oleyl ether (Macol OA-20 polyethoxylated oleyl ether obtained from Mazer Chemical Co.) and 38.315 grams of deionized water. After warming in the water bath, the contents of the second beaker were slowly added to the first beaker and the mixture was ultrasonically homogenized for about 2 minutes, resulting in a stable, very fluid nonionic emulsion.

B. 20.305 grams of the composition prepared as described in Example I was charged to a first 100 millimeter beaker which was placed in a water bath maintained at about 70° to 80° C. To a second 100 millimeter beaker were charged 2.037 grams of 30% Triton TM X-301 anionic surfactant and 37.5 grams of deionized water. After warming in the water bath, the contents of the second beaker were slowly added to the first beaker and the mixture was ultrasonically homogenized for about 2 minutes, resulting in a stable, very fluid, anionic emulsion.

C. 20.333 grams of the composition prepared as described in Example I was charged to a first 100 milliliter beaker which was placed in a water bath maintained at about 70° to 80° C. To a second 100 milliliter beaker were charged 0.616 gram of Ethoquad TM 18/12 cationic surfactant and 37.73 grams of deionized water. After warming in the water bath, the contents of the second beaker were added to the first beaker and the mixture was ultrasonically homogenized for about 2 minutes, resulting in a stable, very fluid cationic emulsion.

EXAMPLE III

The emulsions A, B and C prepared as described in Example II, were evaluated for surface repellency to various fluids, as follows.

The test used to evaluate surface repellency is a variation of the "3M Kit Test" (TAPPI om-557). Generally speaking, the test consists of preparing a series of test liquids of decreasing surface tension. Five drops of each of the test liquids are placed on the surface of a sized paper specimen. After 5 minutes the area of the specimen under each drop is examined to determine the extent of darkening of the test area, repellency being rated on a scale of from 0 (complete wetting and saturation) to 5 (non-wettable). Results are reported as the average rating of the five test drops. The test liquids used were water, 20:80 wt-% acetone:water, 50:50 wt-% acetone:water and the following Kit oil mixtures:

| Kit No. | Castor Oil (ml) | Toluene (ml) | Heptane (ml) |
| --- | --- | --- | --- |
| 1 | 100 | 0 | 0 |
| 2 | 90 | 5 | 5 |

| Kit No. | Castor Oil (ml) | Toluene (ml) | Heptane (ml) |
| --- | --- | --- | --- |
| 3 | 80 | 10 | 10 |
| 4 | 70 | 15 | 15 |
| 5 | 60 | 20 | 20 |

The paper specimen used in the repellency evaluations was Whatman No. 42 filter paper, a sheet of which was immersed for two minutes in each diluted sizing emulsion composition and dried prior to application of the above test liquids. The sizing emulsions were diluted as follows:

A. 2.0 grams of Emulsion A in 98 grams of deionized water.

B. 2.0 grams of Emulsion B in 98 grams of deionized water.

C. 2.0 grams of Emulsion C in 98 grams of deionized water.

Following the procedure described above, the test paper specimens treated with each of the above sizing emulsions A, B and C were tested with each test liquid and rated (average of 5 samples) as follows:

| Test Liquid | A | B | C |
| --- | --- | --- | --- |
| Water | 5 | 5 | 5 |
| 20% Acetone | 5 | 5 | 5 |
| 50% Acetone | 5 | 4.4 | 5 |
| Kit No. 1 | 5 | 3.8 | 5 |
| Kit No. 2 | 5 | 3.2 | 5 |
| Kit No. 3 | 4.8 | 2.6 | 5 |
| Kit No. 4 | 2.6 | 1.0 | 3.6 |
| Kit No. 5 | 1.0 | 0 | 1.0 |

As the foregoing ratings show, the cationic emulsion (C) of the invention when used provides improved resistance to water and polar solvents as compared to nonionic emulsion (A) and anionic emulsion (B).

EXAMPLE IV

This Example illustrates the use of the cationic emulsions of the invention as an "extender" for costly, conventional fluorocarbon sizing agents, i.e., when used as a cosizing agent with conventional fluorocarbon sizing agent, the cationic emulsion of the invention enables significant reduction of the amount of fluorocarbon sizing agent typically used while imparting commercially acceptable oil and water repellency to sized paper at a substantially reduced total sizing cost.

An aqueous slurry of Pejepscot bleach kraft pulp having a CSF Number of 450 to 500 and a consistency of about 2.4 was prepared. To this slurry was added about 4.0 lb/T on a dry solid/solid basis of Corcat P-18 retention aid and the pH of the slurry was adjusted to between 6.5 and 7.0. To samples of this slurry were added varying amounts of a commercial anionic fluorocarbon size available from Ciba-Geigy, Herculon 40 water repellent size commercially available from Hercules Chemicals, and the cationic emulsion prepared as described in Example IIC. Hand sheets of each slurry sample having a weight of about 290 gm/m² were made substantially in accordance with the procedure described in TAPPI Method T205 om-81. The hand sheets were then tested for water and oil repellency and oil penetration using the following test procedures:

Water Repellency (WR)

The time in seconds for the reflectance of the test sheet to decrease to 80% of the original value after exposure to the acidic ink used in a Hercules Size Tester.

Oil Penetration (OP)

Five (5) drops of hot (230°±10° F.) corn oil is placed on the surface of a 1×5 inch test specimen. The treated specimen is placed in a 230° F. oven for 20 minutes after which excess oil is wiped off and the strip is examined to determine whether any oil has penetrated to the surface opposite to the treated surface.

Oil Repellency (OR)

An adaptation of the "3M Kit Test" and the "DuPont Oleophobic Kit Test", using a rating system of from 0 (complete wetting and saturation) to 5 (non-wettable) after an exposure time to the oil kit of 15 minutes. The rating reported is an average value of the results from 5 test specimens.

The following table lists the quantities of fluorocarbon (FC) size, water repellent size (H-40) and invention emulsion (IIC) added to the pulp slurry in lb/T on a dry solids/solids basis as well as the results of the above described tests:

| SAMPLE | FC | H-40 | IIC | WR | OP | OR |
| --- | --- | --- | --- | --- | --- | --- |
| A | 4.28 | 10.02 | — | ∞ | Yes | 4.3. |
| B | 3.21 | 10.02 | — | ∞ | No | 4.0 |
| C | 4.26 | — | — | 0.8 | Yes | 4.2 |
| D | 4.13 | — | 9.98 | ∞ | Yes | 5.5 |
| E | 3.06 | — | 9.86 | ∞ | Yes | 4.9 |
| F | 2.96 | — | 7.15 | ∞ | Yes | 4.4 |
| G | 3.10 | — | 4.99 | ∞ | Yes | 4.3 |
| H | 2.97 | — | 5.14 | ∞ | Yes | 4.5 |

As the data show, fluorocarbon alone (Sample C) though imparting oil penetrating resistance and oil repellency is not at all effective in imparting water resistance. Also, when the amount of fluorocarbon was reduced by 25% in the presence of the water resistant sizing agent (Sample B), the treated sample failed the oil penetration resistance test. However, use of the invention sizing composition enabled the use of substantially less of the fluorocarbon size. Note especially Sample H wherein acceptable results obtained at a 30% reduction in fluorocarbon usage while only about 50% of the invention composition was required as compared to the commercial water resistant sizing.

When used to surface size paper or other nonwoven substrate, the invention emulsion is applied by any conventional surface sizing technique, e.g., by means of a size press or a size tub, or it can be applied by typically used spraying or coating techniques, or by calendar stack sizing.

Although the invention has been described in some detail by the foregoing, it is to be understood that many variations can be made therein by those skilled in the art without departing from the spirit and scope thereof as defined by the appended claims.

We claim:

1. An aqueous emulsion containing (a) a surface sizing composition comprising the reaction product of a melamine formaldehyde compound, at least one long chain alcohol and at least one long chain polyethoxylated alcohol; and (b) a cationic surfactant.

2. The emulsion of claim 1 wherein the surface sizing composition comprises the reaction product of from about 10 to about 30 weight percent of melamine formaldehyde compound having from 3 to 6 methoxymethyl groups, from about 20 to about 75 weight percent of long chain saturated alcohol and from about 5 to about 35 weight percent of long chain polyethoxylated alcohol.

3. The emulsion of claim 2 wherein the melamine formaldehyde compound is hexamethoxymethyl melamine, the long chain alcohol contains from 12 to 30 carbon atoms and the long chain polyethoxylated alcohol contains from 30 to 120 carbon atoms and from 5 to 50 ethylene oxide groups.

4. The emulsion of claim 3 wherein the long chain saturated alcohol is selected from stearyl alcohol, $C_{20}$ to $C_{24}$ alcohols or mixtures thereof and the long chain polyethoxylated alcohol is selected from polyethoxylated lauryl ether, polyethoxylated oleyl ether or mixtures thereof.

5. The emulsion of claim 4 wherein the surface sizing composition comprises the reaction product of from about 30 to about 50 weight percent stearyl alcohol, from 0 to about 50 percent $C_{20}$ to $C_{24}$ alcohols, from about 5 to about 10 weight percent polyethoxylated lauryl ether or polyethoxylated oleyl ether and from about 15 to about 20 weight percent hexamethoxymethyl melamine.

6. The emulsion of claim 5 wherein the surface sizing composition comprises the reaction product of about 37 to 38 weight percent stearyl alcohol, about 37 to 38 weight percent $C_{20}$ to $C_{24}$ alcohols, about 7 to 8 weight percent polyethoxylated oleyl ether and about 17.5 to 18.5 weight percent hexamethoxymethyl melamine.

7. The emulsion of claim 1 containing from about 20 to about 60 percent by weight based on weight of emulsion of surface sizing composition, from about 1 to 5 percent by weight based on weight of surface sizing composition of cationic surfactant, and the balance, water.

8. The emulsion of claim 7 containing from about 30 to about 40 percent by weight of surface sizing composition and from about 2 to about 4 percent by weight of cationic surfactant.

9. The emulsion of claim 1 wherein the cationic surfactant is represented by the formula:

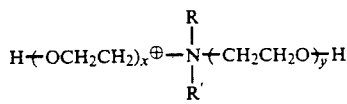

wherein R is $C_1$ to $C_{10}$ alkyl; R' is $C_{10}$ to $C_{30}$ alkyl; and x and y are the same or different and represent an integer from 1 to 25.

10. In a method of treating a nonwoven substrate wherein an aqueous emulsion of a sizing composition is surface coated on the substrate to impart oil, water and polar solvent resistance thereto, wherein the improvement comprises using the emulsion defined in claim 1.

11. The improvement of claim 10 wherein the substrate is paper or paperboard.

12. In a method of treating a nonwoven substrate wherein an aqueous emulsion of a fluorocarbon sizing composition is surface coated on the substrate to impart oil resistance thereto, the improvement comprising replacing a substantial portion of the fluorocarbon sizing composition with the aqueous emulsion of claim 1.

13. The improvement of claim 12 wherein the substrate is paper or paperboard.

14. The emulsion of claim 1 wherein the long chain polyethoxylated alcohol contains from 30 to 120 carbon atoms and from 5 to 50 ethylene oxide groups.

* * * * *